US011972761B2

(12) United States Patent
Choi

(10) Patent No.: US 11,972,761 B2
(45) Date of Patent: Apr. 30, 2024

(54) ELECTRONIC DEVICE FOR SHARING USER-SPECIFIC VOICE COMMAND AND METHOD FOR CONTROLLING SAME

(71) Applicant: SAMSUNG ELECTRONICS CO., LTD., Suwon-si (KR)

(72) Inventor: Heejae Choi, Suwon-si (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 457 days.

(21) Appl. No.: 17/285,391

(22) PCT Filed: Jul. 2, 2019

(86) PCT No.: PCT/KR2019/008024
§ 371 (c)(1),
(2) Date: Apr. 14, 2021

(87) PCT Pub. No.: WO2020/091183
PCT Pub. Date: May 7, 2020

(65) Prior Publication Data
US 2021/0343283 A1 Nov. 4, 2021

(30) Foreign Application Priority Data
Oct. 30, 2018 (KR) .................. 10-2018-0131066

(51) Int. Cl.
G10L 15/22 (2006.01)
G06F 3/16 (2006.01)
G10L 15/18 (2013.01)

(52) U.S. Cl.
CPC .............. *G10L 15/22* (2013.01); *G06F 3/167* (2013.01); *G10L 15/1822* (2013.01);
(Continued)

(58) Field of Classification Search
None
See application file for complete search history.

(56) References Cited

U.S. PATENT DOCUMENTS 9,229,681 B2 * 1/2016 Cho .................. G10L 15/22
9,529,738 B2 12/2016 Choi et al.
(Continued)

FOREIGN PATENT DOCUMENTS

JP 2007324866 A * 12/2007 ........... G10L 15/265
KR 10-2012-0093597 A 8/2012
(Continued)

OTHER PUBLICATIONS

English Translation of JP2007-324866 A. (Year: 2007).*
(Continued)

*Primary Examiner* — Richard Z Zhu
(74) *Attorney, Agent, or Firm* — Sughrue Mion, PLLC

(57) ABSTRACT

An electronic device and a method for controlling an electronic device are provided. The electronic device according to the disclosure includes a communicator; and a processor configured to: receive information on a plurality of function and a voice command for executing the plurality of functions, and function environment information for executing the plurality of functions, through the communicator, determine whether or not the electronic device executes the plurality of functions based on environment information and the functional environment information of the electronic device, when a received user's voice corresponds to the voice command, and control the electronic device to perform an operation corresponding to the determination result.

8 Claims, 12 Drawing Sheets

(52) U.S. Cl.
CPC .... *G10L 15/1815* (2013.01); *G10L 2015/223* (2013.01); *G10L 2015/225* (2013.01); *G10L 2015/228* (2013.01)

(56) References Cited

U.S. PATENT DOCUMENTS

| | | | |
|---|---|---|---|
| 9,774,640 B2* | 9/2017 | Subramanian | H04W 4/80 |
| 9,842,490 B2* | 12/2017 | Shin | G05B 15/02 |
| 9,984,686 B1* | 5/2018 | Mutagi | G10L 15/26 |
| 10,074,365 B2* | 9/2018 | Zhang | G10L 15/22 |
| 10,542,144 B2 | 1/2020 | Kim et al. | |
| 10,796,694 B2 | 10/2020 | Kim et al. | |
| 2004/0030560 A1 | 2/2004 | Takami et al. | |
| 2006/0036642 A1* | 2/2006 | Horvitz | H04L 67/51 707/999.102 |
| 2012/0209608 A1* | 8/2012 | Lee | G06F 3/167 704/E21.001 |
| 2014/0070925 A1* | 3/2014 | Shin | G05B 15/02 340/12.5 |
| 2014/0358535 A1* | 12/2014 | Lee | G10L 17/22 704/233 |
| 2015/0043729 A1 | 2/2015 | Gopal et al. | |
| 2015/0143530 A1 | 5/2015 | Lee et al. | |
| 2019/0004673 A1* | 1/2019 | Jang | G06F 3/0483 |
| 2019/0235887 A1* | 8/2019 | Hemaraj | G06F 3/167 |
| 2020/0357411 A1* | 11/2020 | Wang | G10L 15/1822 |

FOREIGN PATENT DOCUMENTS

| | | |
|---|---|---|
| KR | 10-2013-0125064 A | 11/2013 |
| KR | 10-2014-0012504 A | 2/2014 |
| KR | 10-2015-0054636 A | 5/2015 |
| KR | 10-2015-0057707 A | 5/2015 |
| KR | 10-2015-0095307 A | 8/2015 |
| KR | 10-2016-0078553 A | 7/2016 |
| KR | 10-2017-0100309 A | 9/2017 |
| KR | 10-2017-0124104 A | 11/2017 |

OTHER PUBLICATIONS

International Written Opinion dated Oct. 15, 2019 issued by the International Searching Authority in International Application No. PCT/KR2019/008024 (PCT/ISA/237).

International Search Report dated Oct. 15, 2019 issued by the International Searching Authority in International Application No. PCT/KR2019/008024 (PCT/ISA/210).

* cited by examiner

FIG. 9
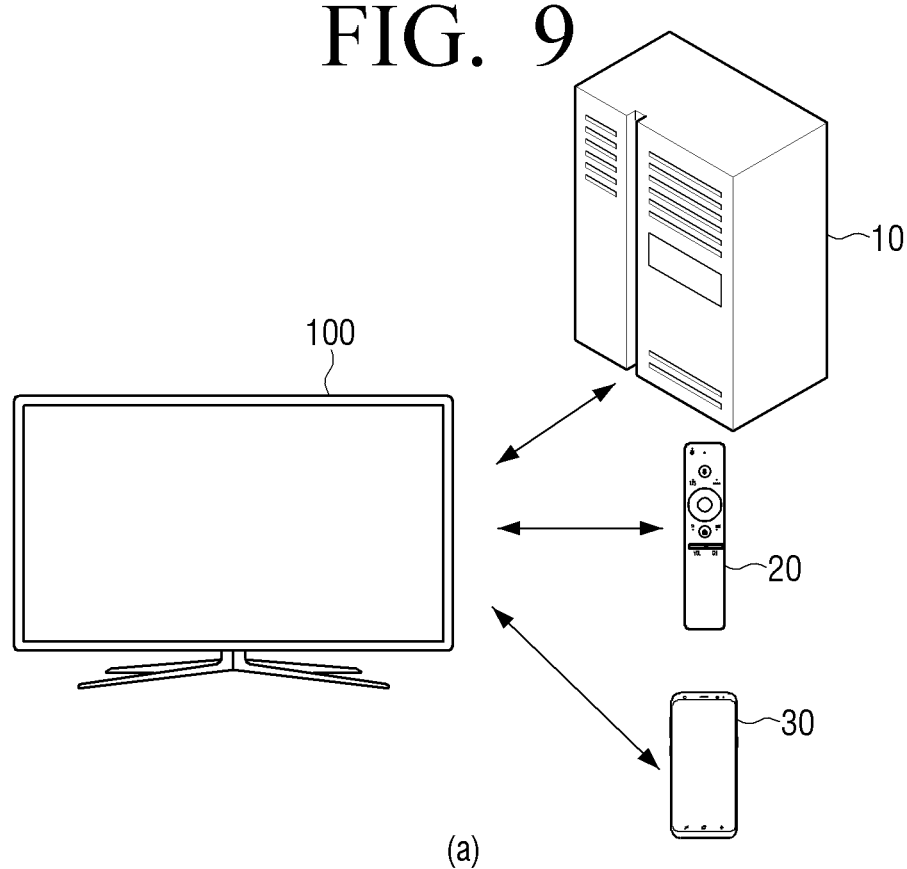
(a)
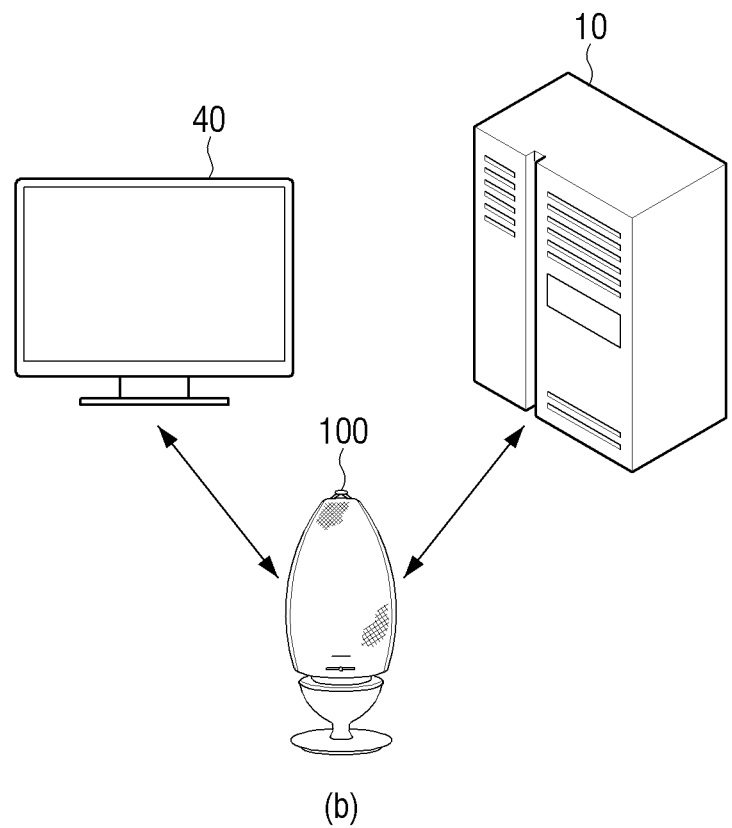
(b)

ELECTRONIC DEVICE FOR SHARING USER-SPECIFIC VOICE COMMAND AND METHOD FOR CONTROLLING SAME

TECHNICAL FIELD

The disclosure relates to an electronic device and a method of controlling the same, and more particularly, to an electronic device capable of sharing a user-specific voice command and a method of controlling the same.

BACKGROUND ART

With the development of electronic technology, various electronic devices have recently been developed. In particular, electronic devices capable of performing functions (or actions) on a user's voice are being developed using an artificial intelligence (AI) model that implements human-level intelligence.

In particular, a function that the electronic device performs by recognizing a user's voice (or key word) is limited to a function associated with the user's voice. In this case, in order for the electronic device to perform a plurality of functions, there was an inconvenience in that the user should sequentially utter each user's voice associated with each function. In order to alleviate the user's inconvenience described above, by setting a plurality of functions in a voice command, the electronic device can perform the plurality of functions.

However, even if the user has set the plurality of functions in the voice command in the electronic device, when the user attempts to use the voice command in another electronic device, there is a problem in that the same process of setting the voice command in another electronic device must be repeated.

In addition, even if the voice command set by a user may be shared with another electronic device, there is a problem in that the plurality of functions set in the voice command may not be performed depending on an environment between the devices.

DISCLOSURE

Technical Problem

The disclosure provides an electronic device capable of sharing a voice command that is set to allow a user to perform a plurality of functions with one utterance, and a method for controlling the same.

Technical Solution

According to an embodiment of the disclosure, an electronic device includes a communicator; and a processor configured to: receive information on a plurality of function and a voice command for executing the plurality of functions, and function environment information for executing the plurality of functions, through the communicator, determine whether or not the electronic device executes the plurality of functions based on environment information of the electronic device and the functional environment information, when a received user's voice corresponds to the voice command, and control the electronic device to perform an operation corresponding to the determination result.

The processor may be configured to: determine an environment of the electronic device required to execute the plurality of functions based on the functional environment information, determine that the electronic device executes the plurality of functions when the environment of the electronic device matches the determined environment based on the environment information of the electronic device, and determine that the electronic device does not execute the plurality of functions when the environment of the electronic device does not match the determined environment based on the environment information of the electronic device.

The processor may be configured to execute the plurality of functions corresponding to the voice command when it is determined that the electronic device executes the plurality of functions.

The processor may be configured to set an environment of the electronic device based on the functional environment information and execute the plurality of functions corresponding to the voice command based on the set environment, when it is determined that the electronic device does not execute the plurality of functions.

The processor may be configured to provide a guide related to the plurality of functions when it is determined that the electronic device does not execute the plurality of functions.

The guide may include at least one of information on an environment required to execute the plurality of functions, information on functions that are not executed among the plurality of functions, or information on the last function executed among the plurality of functions executed sequentially when the plurality of functions are sequentially executed according to the voice command.

The environment information of the electronic device and the functional environment information may include at least one of information on hardware included in the electronic device, setting information of the electronic device, or information on an application installed in the electronic device.

The processor may be configured to receive the information on the plurality of functions and the voice command for executing the plurality of functions, and the functional environment information for executing the plurality of functions from a server.

The processor may be configured to receive the user's voice through a microphone included in the electronic device, or receive the user's voice from an external electronic device through the communicator.

According to another embodiment of the disclosure, a method for controlling an electronic device includes receiving information on a plurality of function and a voice command for executing the plurality of functions, and function environment information for executing the plurality of functions; determining whether or not the electronic device executes the plurality of functions based on environment information of the electronic device and the functional environment information, when a received user's voice corresponds to the voice command; and controlling the electronic device to perform an operation corresponding to the determination result.

The determining of whether or not the electronic device executes the plurality of functions may include: determining an environment of the electronic device required to execute the plurality of functions based on the functional environment information, determining that the electronic device executes the plurality of functions when the environment of the electronic device matches the determined environment based on the environment information of the electronic device, and determining that the electronic device does not execute the plurality of functions when the environment of the electronic device does not match the determined environment based on the environment information of the electronic device.

The determining of whether or not the electronic device executes the plurality of functions may include executing the plurality of functions corresponding to the voice command when it is determined that the electronic device executes the plurality of functions.

The determining of whether or not the electronic device executes the plurality of functions may include setting an environment of the electronic device based on the functional environment information and executing the plurality of functions corresponding to the voice command based on the set environment, when it is determined that the electronic device does not execute the plurality of functions.

The determining of whether or not the electronic device executes the plurality of functions may include providing a guide related to the plurality of functions when it is determined that the electronic device does not execute the plurality of functions.

The guide may include at least one of information on an environment required to execute the plurality of functions, information on functions that are not executed among the plurality of functions, or information on the last function executed among the plurality of functions executed sequentially when the plurality of functions are sequentially executed according to the voice command.

The environment information of the electronic device and the functional environment information may include at least one of information on hardware included in the electronic device, setting information of the electronic device, or information on an application installed in the electronic device.

Here, in the receiving of the information on the plurality of functions and the voice command for executing the plurality of functions and the functional environment information for executing the plurality of functions, the information on the plurality of functions and the voice command for executing the plurality of functions and functional environment information for executing the plurality of functions may be received from a server.

The user's voice may be received through a microphone included in the electronic device or may be received from an external electronic device.

Advantageous Effects

According to the diverse embodiments of the disclosure as described above, it is possible to provide an electronic device capable of sharing a voice command that is set to allow a user to perform a plurality of functions with one utterance, and a method for controlling the same.

In addition, by sharing environmental information necessary for the electronic device to perform the function together with the voice command, information on a function that may not be performed by the voice command may be provided to the user.

In addition, user convenience may be increased in that the user does not need to repeatedly set the voice command for each of the plurality of electronic devices.

In addition, a user experience may be improved in that the user may use a user-specific voice command in a continuous environment between the plurality of electronic devices and may share a voice command between different users.

DESCRIPTION OF DRAWINGS

FIG. 9 is a diagram illustrating an electronic device according to another embodiment of the disclosure.

BEST MODE

Figure 1:
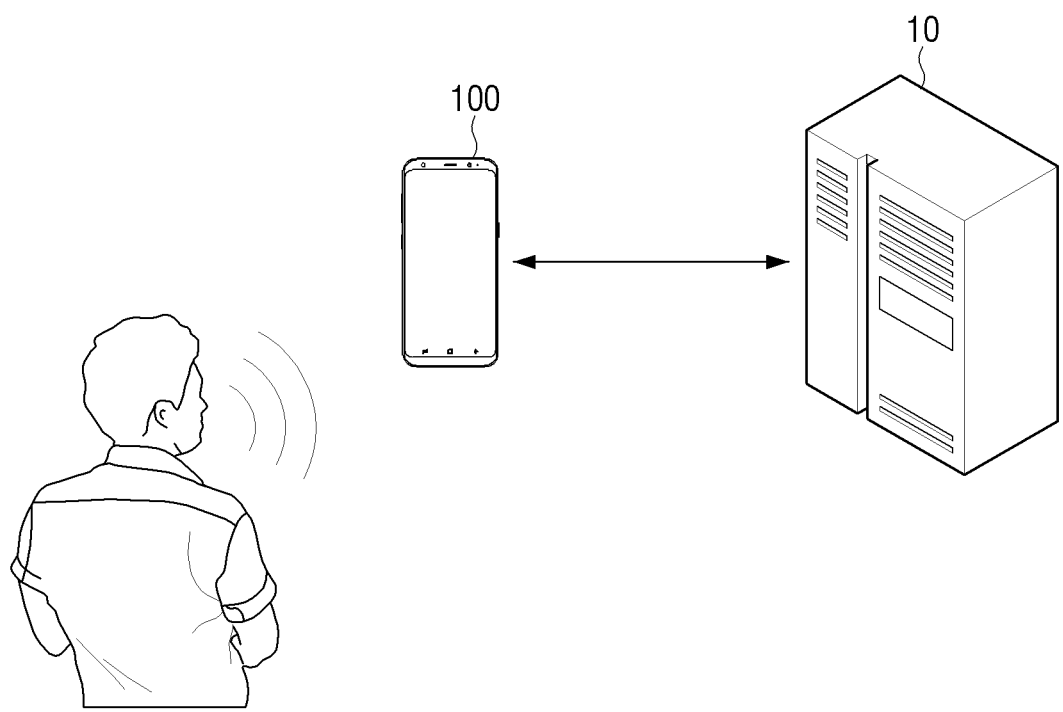
FIG. 1 is a diagram illustrating a system for providing a voice recognition service according to an embodiment of the disclosure.

In describing the disclosure, when it is decided that a detailed description for the known functions or configurations related to the disclosure may unnecessarily obscure the gist of the disclosure, the detailed description thereof will be omitted. In addition, the following embodiments may be modified to several different forms, and the scope and spirit of the disclosure are not limited to the following embodiments. Rather, these embodiments make the disclosure thorough and complete, and are provided in order to completely transfer the technical spirit of the disclosure to those skilled in the art.

It is to be understood that technologies mentioned in the disclosure are not limited to specific embodiments, but include various modifications, equivalents, and/or alternatives according to embodiments of the disclosure. In connection with the description of the drawings, similar reference numerals may be used for similar elements.

Expressions such as "first," or "second," used in the present disclosure may modify various components regardless of order and/or importance, and are used to distinguish one component from another component, and do not limit the corresponding components.

In the disclosure, an expression "A or B", "at least one of A and/or B", "one or more of A and/or B", or the like, may include all possible combinations of items listed together. For example, "A or B", "at least one of A and B", or "at least one of A or B" may indicate all of 1) a case in which at least one A is included, 2) a case in which at least one B is included, or 3) a case in which both of at least one A and at least one B are included.

In the disclosure, the singular expression includes the plural expression unless the context clearly indicates otherwise. It should be further understood that the term "include" or "constituted" used in the application specifies the presence of features, numerals, steps, operations, components, parts mentioned in the specification, or combinations thereof, but do not preclude the presence or addition of one or more other features, numerals, steps, operations, components, parts, or combinations thereof.

When it is mentioned that any component (for example, a first component) is (operatively or communicatively) coupled with/to or is connected to another component (for example, a second component), it is to be understood that any component is directly coupled to another component or may be coupled to another component through another component (for example, a third component). On the other hand, when it is mentioned that any component (for example, a first component) is "directly coupled with/to" or "directly connected to" to another component (for example, a second component), it is to be understood that another component (for example, a third component) is not present between any component and another component.

An expression "configured (or set) to" used in the disclosure may be replaced by, for example, an expression "suitable for", "having the capacity to", "designed to", "adapted to", "made to", or "capable of" depending on a situation. A term "configured (or set) to" may not necessarily mean only "specifically designed to" in hardware. Instead, in any context, an expression "a device configured to" may mean that the device is "capable of" together with other devices or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory device.

In the disclosure, the electronic device may be implemented as a device such as a smartphone, a tablet PC, a mobile telephone, a telephone, an e-book reader, a desktop PC, a laptop PC, a workstation, server, a PDA, a portable multimedia player (PMP), an MP3 player, a medical device, a camera, TV, a digital video disk (DVD) player, a refrigerator, an air conditioner, a cleaner, an oven, a microwave oven, a washing machine, an air cleaner, a set-top box, a home automation control panel, a security control panel, a media box (for example, HomeSync™ of Samsung Electronics Co., Ltd, TV™ of Apple Inc, or TV™ of Google), a game console (for example Xbox™ and PlayStation™), an electronic dictionary, an electronic key, a camcorder, a digital photo frame, or a wearable device. Here, the wearable device may include at least one of an accessory type (for example, a watch, a ring, a bracelet, an ankle bracelet, a necklace, a glasses, a contact lens, or a head-mounted-device (HMD)), a textile or clothing integral type (for example, an electronic clothing), a body attachment type, or a bio-implantable circuit.

Hereinafter, various embodiments of the disclosure will be described in detail with reference to the accompanying drawings.

FIG. 1 is a diagram illustrating a system for providing a voice recognition service according to an embodiment of the disclosure.

Referring to FIG. 1, a system for providing a voice recognition service may include an electronic device 100 and a voice recognition server 10.

The electronic device 100 is a device capable of communicating with the voice recognition server 10 according to various types of communication methods, and may be implemented as a smartphone as illustrated in FIG. 1. However, this is only an example, and the electronic device 100 may be implemented as various types of devices as described above.

The electronic device 100 may perform voice recognition on a user's voice uttered by a user, and provide information or perform an operation according to the recognized result.

To this end, the electronic device 100 may directly receive the user's voice uttered by the user through a microphone (not illustrated) provided in the electronic device 100 or may receive the user's voice from an external electronic device (not illustrated).

At this time, when a trigger command (e.g., "Hi Bixby" and the like) is uttered by the user, or a user command (e.g., touch and the like) for performing voice recognition is input through an inputter (e.g., a button inputter, a touch inputter, and the like) provided in the electronic device 100, the electronic device 100 may perform an operation of receiving the user's voice to perform the voice recognition. Here, the trigger command may be a keyword for executing voice recognition, and when the trigger command uttered by the user is received, the electronic device 100 may perform voice recognition on a user's voice received after the trigger command.

In addition, the electronic device 100 may transmit the received user's voice to the voice recognition server 10 providing a voice recognition service.

The voice recognition server 10 is a server capable of communicating with the electronic device 100 according to various types of communication methods, and providing the voice recognition service.

As an example of the disclosure, when a user's voice is received from the electronic device 100, the voice recognition server 10 may perform voice recognition on the received user's voice and transmit response information to the electronic device 100 as a result obtained by performing the voice recognition.

Here, the voice recognition server 10 may be implemented as a main server that performs a speech to text (STT) function and a function of acquiring response information. That is, the voice recognition server 10 may include an automatic speech recognition (ASR) module, a natural language understanding (NLU) module, a dialogue management (DM) module, and a natural language generation (NLG) module.

Specifically, when the user's voice is received, the voice recognition server 10 may convert the received user's voice into a text through an STT algorithm. In this case, the voice recognition server 10 may extract an utterance element from the converted text, and detect an operation requested by the user based on the utterance element. Here, the utterance element may be a keyword for performing the operation requested by the user within the received user's voice.

In addition, the voice recognition server 10 may acquire response information as feedback corresponding to the received user's voice by performing the operation requested by the user. Thereafter, the server 10 may transmit the response information to the electronic device 100.

In this case, the electronic device 100 may provide the response information received from the voice recognition server 10.

Meanwhile, when information on a plurality of functions and a voice command is received from an external electronic device (not illustrated), the electronic device 100 may process the received information and map the plurality of functions to the voice command. Accordingly, when a user's voice corresponding to the voice command is received, the electronic device 100 may execute the plurality of functions mapped to the voice command.

In this case, user convenience may be increased in that the user does not need to repeatedly set the voice command for each of the plurality of electronic devices. In addition, a user experience may be improved in that the user may use a user-specific voice command in a continuous environment between the plurality of electronic devices.

Hereinafter, the present disclosure will be described in more detail with reference to the accompanying drawings.

Figure 2:
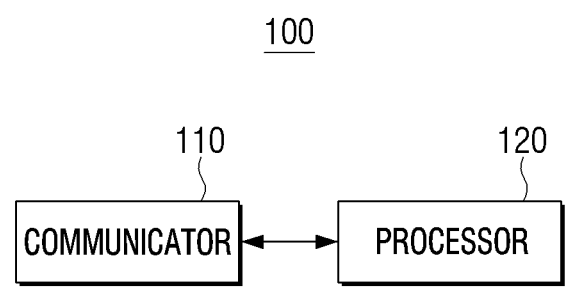
FIG. 2 is a block diagram of an electronic device according to an embodiment of the disclosure.

FIG. 2 is a block diagram of an electronic device according to an embodiment of the disclosure.

Referring to FIG. 2, the electronic device 100 may include a communicator 110 and a processor 120.

The communicator 110 may transmit and receive various types of information by performing communication with various types of external devices such as an external electronic device 200 and a server 300 according to various types of communication methods. At this time, the communicator 110 may be controlled by the processor 120.

To this end, the communicator 110 may include at least one of a Bluetooth chip, a Wi-Fi chip, a wireless communication chip, a near field communication (NFC) chip, etc. for performing wireless communication, and an Ethernet module and a USB module, etc. for performing wired communication.

The processor 120 may control an overall operation of the electronic device 100.

Figure 6:
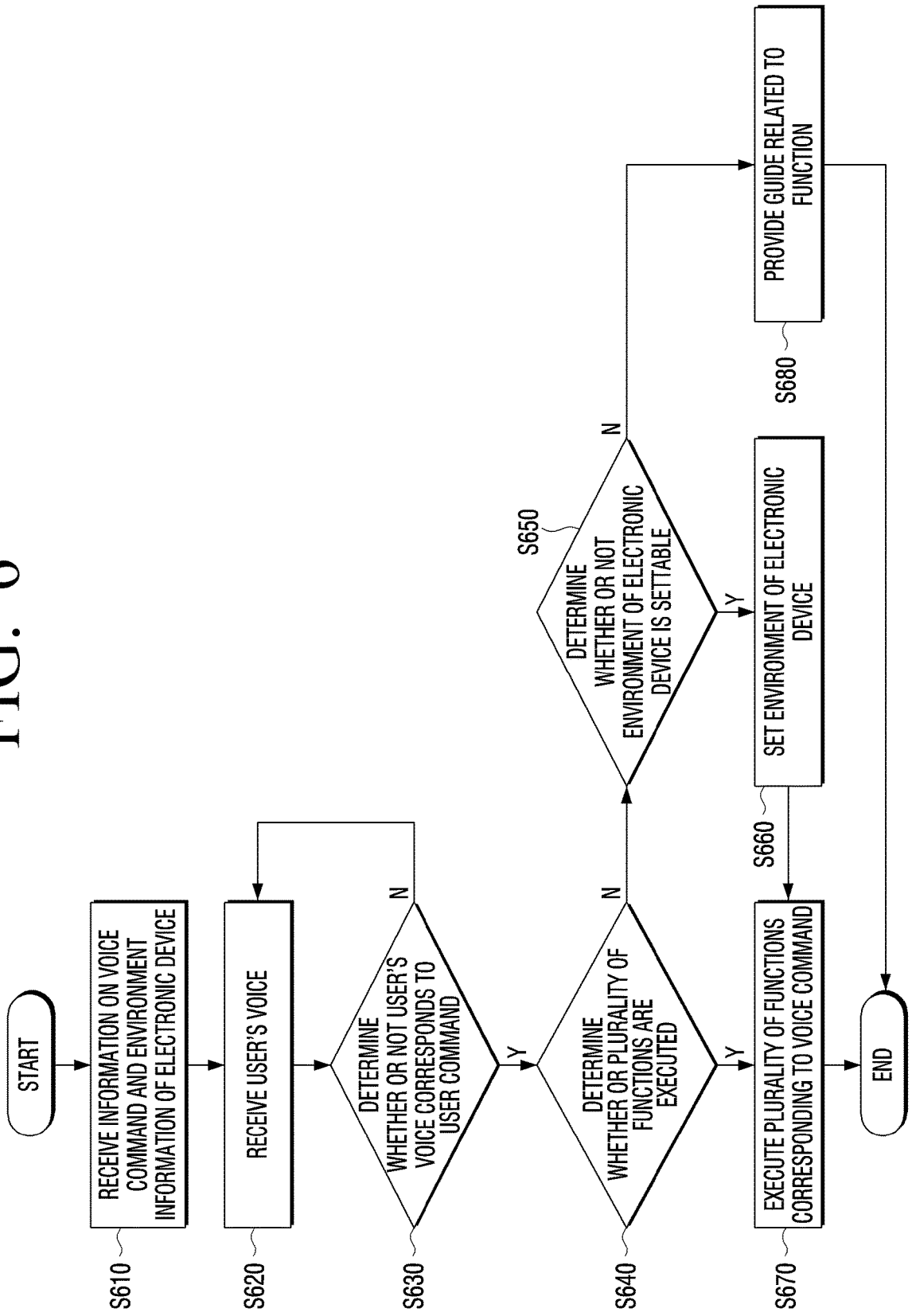
FIG. 6 is a diagram illustrating an electronic device according to an embodiment of the disclosure.

An operation of the processor 120 will be described in detail with reference to FIG. 6.

The processor 120 may receive information on a plurality of function and a voice command for executing the plurality of functions, and functional environment information for executing the plurality of functions through the communicator 110 (S610).

At this time, the function may refer to an operation executed by the electronic device 100 when the electronic device 100 acquires a voice command as a result obtained by performing voice recognition. For example, the functions may be the operations executed by the electronic device 100 such as "View photos in photo gallery app", "Make a call from the phone app", "View unread messages in message app", "Guide to a destination in a navigation app", "View search results in web browser app", and "Reduce a speaker volume in a setting app".

Meanwhile, the information on the voice command may include the voice command and information on the plurality of functions mapped to the voice command. Here, the voice command is a user-specific command, and may be a keyword that requests the electronic device 100 to execute the plurality of functions corresponding to the voice command.

Meanwhile, the functional environment information includes information on an environment of the electronic device 100 required to execute the function, and at least one environment may correspond to each function.

Specifically, the functional environment information may include at least one of information on hardware included in the electronic device 100, setting information on the electronic device 100, or information on an application installed in the electronic device 100.

Here, the information on the hardware may refer to information on physical components of the electronic device 100, such as information on a camera, information on a display, information on a sensor, information on a CPU, and information on a memory. At this time, the information on the hardware may include hardware embedded in the electronic device 100 as well as hardware embedded in an external device (e.g., a camera connected through a USB module) connected to the electronic device 100 by a wired manner.

The setting information may refer to information on a setting state of the electronic device 100 such as a speaker volume, brightness of a display, an on/off state of a display, an on/off state of a GPS, an on/off state of Wi-Fi, an on/off state of Bluetooth, a cellular on/off state, a power saving mode state, an airplane mode state, and an interference prohibition mode state.

The information on the application may refer to information including an identifier assigned for each application and whether or not a specific application is installed in the electronic device 100.

For example, the functional environment information may include information such as that the functional environment information for the function such as "guide to a destination in a navigation app" will be provided in a GPS module as information on hardware, a GPS is in an on state as the setting information, and the navigation app is installed as information on the application.

Figure 3:
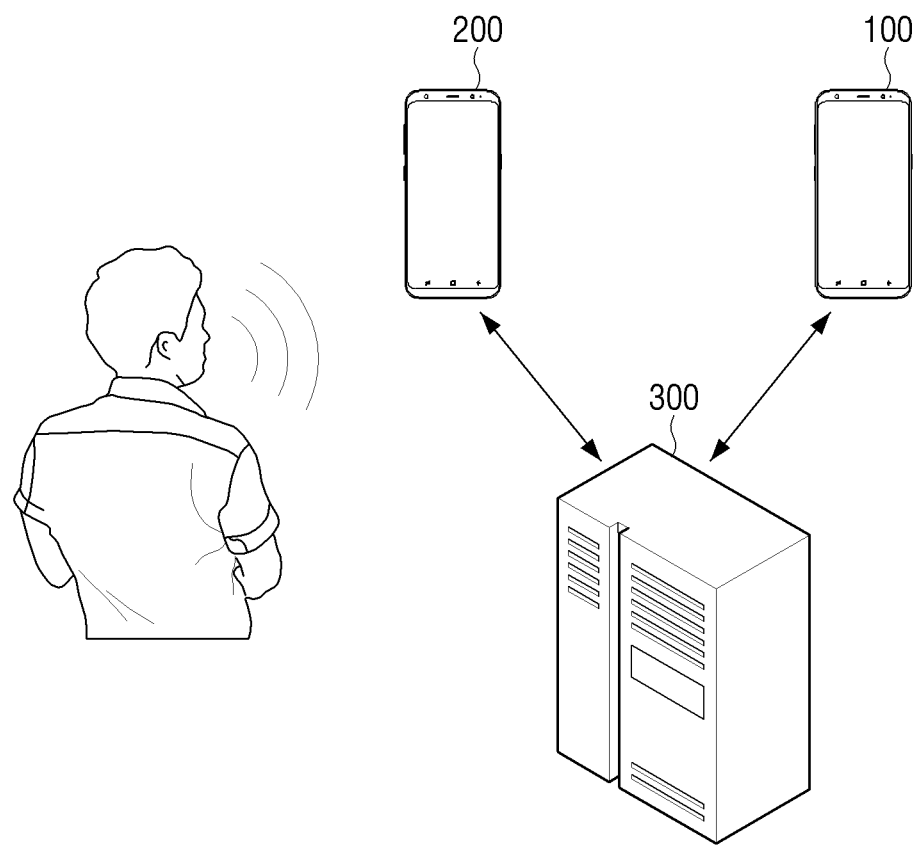
FIG. 3 is a diagram illustrating a system for sharing a voice command according to an embodiment of the disclosure.
Figure 4:
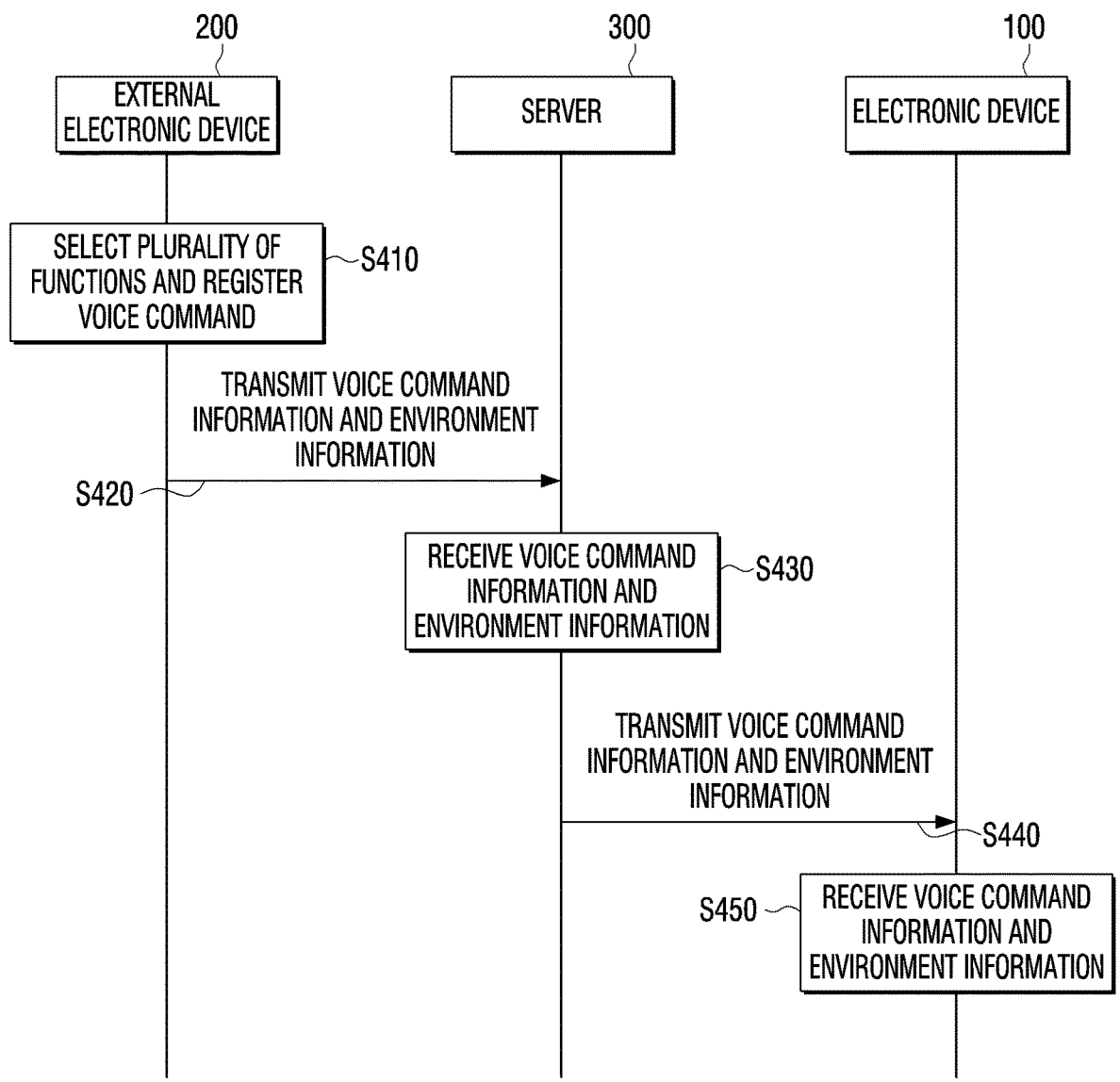
FIGS. 4 and 5 are diagrams illustrating a method for sharing a voice command according to an embodiment of the disclosure.

According to an embodiment of the disclosure, referring to FIGS. 3 and 4, the processor 120 may receive the information on the plurality of functions and the voice command for executing the plurality of functions, and the functional environment information for executing the plurality of functions from the server 300 through the communicator 110.

Here, the external electronic device 200 is a device capable of communicating with the server 300 according to various types of communication methods, and may be implemented as a smartphone as illustrated in FIG. 3. However, this is only an example, and the external electronic device 200 may be implemented as various types of devices such as the electronic device 100.

Meanwhile, the server 300 may transmit and receive the information on the plurality of functions and the voice command for executing the plurality of functions, and the functional environment function for executing the plurality of functions by communicating with the electronic device 100 and the external electronic device 200 according to various types of communication methods. To this end, the server 300 may be implemented as a server providing services such as an SNS service, a cloud service, and an e-mail, or a server providing an authentication service.

Meanwhile, when the voice command is registered and the plurality of functions are selected by the user, the external electronic device 200 may generate information on the plurality of functions and the voice command by mapping the plurality of functions to the voice command (S410).

As an example, when a user command for generating a voice command is received, the external electronic device 200 may convert the received user's voice into text using the STT algorithm, and obtain the converted text as a voice command (e.g., "I came home").

Meanwhile, as another example, when a user command for generating a voice command is received, the external electronic device 200 may obtain the voice command from a keyword input by a user in a text type.

In addition, the external electronic device 200 may provide a list of functions that may be executed in the external electronic device 200 to the user. Thereafter, when a user command for selecting a plurality of functions (e.g., select "turn on classical music in a music app" and "turn on an interference prohibition mode in a settings app") is received, the external electronic device 200 may generate information on the plurality of functions and the voice command for executing the plurality of functions by mapping the plurality of functions selected by the user to the acquired voice command.

Thereafter, when a user command for transmitting the voice command to the server 300 is received, the external electronic device 200 may transmit the information on the plurality of functions and the voice command, and the functional environmental information (S420).

To this end, the external electronic device 200 may generate functional environment information together when generating the information on the plurality of functions and the voice command. In this case, the external electronic device 200 may store the functional environment information in a memory (not illustrated) of the external electronic device 200. Accordingly, the external electronic device 200 may generate the functional environment information at a time point at which the voice command is generated, which is a time point preceding a time point at which the voice command is shared, and may store the functional environment information in the memory of the external electronic device 200 in order to share the functional environment information together when the voice command is shared later.

Meanwhile, as another example, the external electronic device 200 may generate the functional environment information when the voice command is received and the plurality of functions corresponding to the voice command are normally executed. In this case, the functional environment information is considered to be changed according to the environment of the external electronic device 200. The external electronic device 200 may store the functional environment information in the memory of the external electronic device 200 to share functional environment information together when the voice command is shared later.

When a user command for transmitting the voice command is received, the external electronic device 200 may generate the functional environment information.

Meanwhile, as another example, when a user command for transmitting the voice command is received, the external electronic device 200 may generate the functional environment information.

The server 300 may receive the information on the plurality of functions and the voice command and the functional environment information from the external electronic device 200 (S430). In addition, when the user command for transmitting the voice command is received, the server 300 may transmit the information on the plurality of functions and the voice command, and the functional environmental information received from the external electronic device 200 to the electronic device 100 (S440).

Here, the server 300 may transmit the information on the plurality of functions and the voice command and the functional environment information to the electronic device 100 only when receiving authentication information by performing an authentication process.

Here, the authentication process may be implemented with a symmetric key encryption method, a public key encryption method, or the like, or may be implemented in a method in which the electronic device 100 and the external electronic device 200 log in to the same user account. However, this is only an example, and the authentication process may be implemented in a method of approving permission between accounts, such as a family account, even when different users log in to each account.

Accordingly, the electronic device 100 may receive the information on the plurality of functions and the voice command and the functional environment information from the server 300 (S450).

Specifically, the electronic device 100 and the external electronic device 200 may receive the information on the plurality of functions and the voice command and the functional environment information from the server 300 through the method in which the electronic device 100 and the external electronic device 200 log in to the same user account.

As another example, the electronic device 100 and the external electronic device 200 may receive the information on the plurality of functions and the voice command and the functional environment information from the server 300 when approving permission between accounts, such as a family account, even when the electronic device 100 and the external electronic device 200 log in to accounts of different users, respectively. Meanwhile, the electronic device 100 may receive the information on the plurality of functions and the voice command and the functional environment information from the server that provides services such as an SNS service, a cloud service, and an e-mail.

As such, when the electronic device 100 and the external electronic device 200 share the functional environment information, the electronic device 100 and the external electronic device 200 may be synchronized in real time through the server 300. However, even in this case, it may be restricted to share the functional environment information and the like only when the approval is obtained by the user and a message notifying the user of the sharing of functional environment information may also be provided when the functional environment information is shared.

Figure 5:
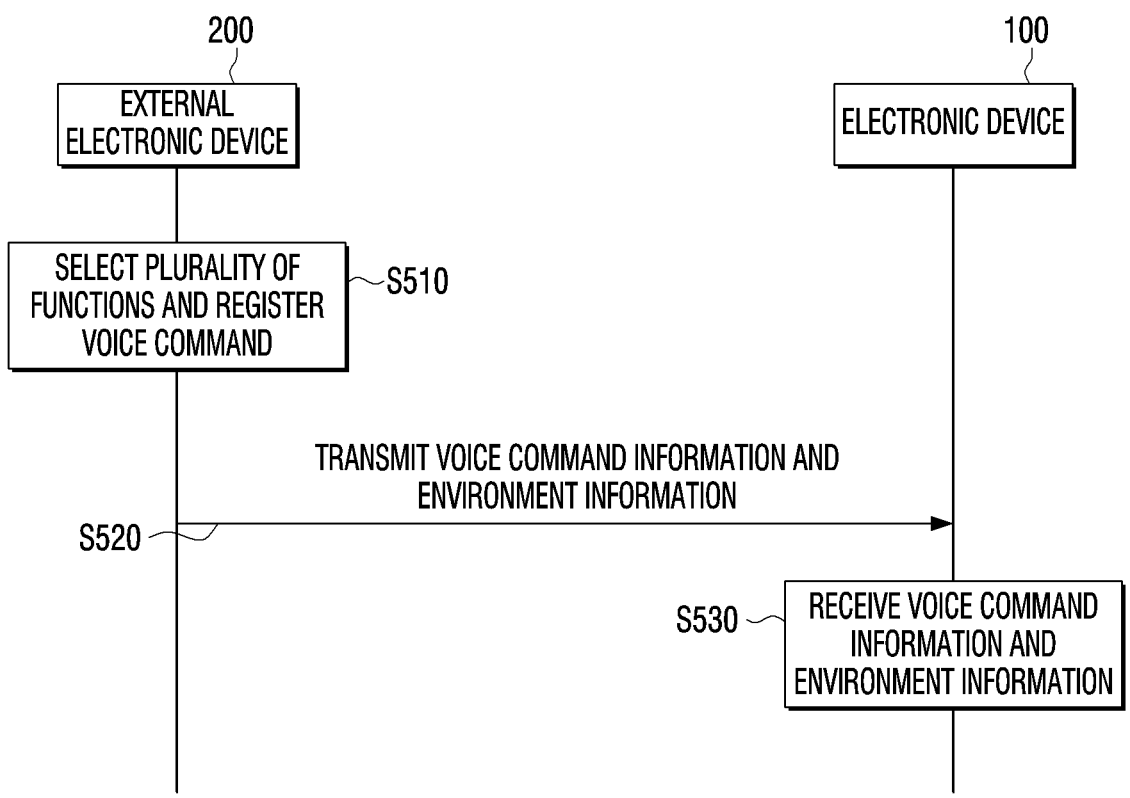

According to another embodiment of the disclosure, referring to FIG. 5, the processor 120 may receive the information on the plurality of functions and the voice command for executing the plurality of functions, and the functional environment information for executing the plurality of functions from the external electronic device 200 through the communicator 110.

To this end, when the voice command is registered and the plurality of functions are selected by the user, the external electronic device 200 may generate the information on the plurality of functions and the voice command by mapping the plurality of functions to the voice command (S510).

Thereafter, when a user command for transmitting the voice command to the electronic device 100 is received, the external electronic device 200 may transmit the information on the plurality of functions and the voice command, and the functional environmental information (S520).

Accordingly, the electronic device 100 may receive the information on the plurality of functions and the voice command and the functional environment information from the external electronic device 200 (S530).

Here, the electronic device 100 may receive the information on the plurality of functions and the voice command and the functional environment information only when transmitting authentication information by performing an authentication process.

Next, referring to FIG. 6 again, the processor 120 may receive a user's voice (S620).

Here, the processor 120 may receive the user's voice through a microphone (not illustrated) provided in the electronic device 100, or may receive the user's voice from the external electronic device 200 through the communicator 110.

Specifically, the processor 120 may receive the user's voice uttered by the user through a microphone (not illustrated) provided in the electronic device 100 or through an external microphone (not illustrated) connected by a wired manner through an input/output port (not illustrated) of the electronic device 100. In this case, the processor 120 may receive a user's voice, which is a digital signal, from a user's voice, which is an analog signal, through the microphone.

In addition, the processor 120 may receive the user's voice from the external electronic device 200 through the communicator 110 of the electronic device 100. In this case, the external electronic device 200 is a separate external electronic device that transmits data by performing communication with the electronic device 100, and may include the external electronic device 200 that transmits the information on the voice command and the functional environment information for executing the plurality of functions.

Next, if the user's voice is received, the processor 120 may determine whether or not the received user's voice corresponds to the voice command (S630).

Specifically, if the user's voice is received, the processor 120 may convert the received user's voice into a text through an STT algorithm.

In addition, the processor 120 may obtain a matching value by comparing similarity between the text corresponding to the voice command and the text converted from the received user's voice in information on the received voice command. However, this is only an example, and the processor 120 may obtain the matching value by comparing the similarity of the waveform of the voice command in the waveform of the received user's voice and the information on the voice command.

In this case, if the matching value is less than a predetermined value, the processor 120 may determine that the received user's voice does not correspond to the voice command (S630: N) and may receive the user voice again (S620).

On the other hand, if the matching value is the predetermined value or more, the processor 120 may determine that the received user's voice corresponds to the voice command.

Accordingly, the electronic device 100 may preferentially determine a user-specific voice command, and determine whether the user voice independently received without passing through the voice recognition server 10 corresponds to the voice command.

Next, if the received user's voice corresponds to the voice command (S630: Y), the processor 120 may determine whether or not the electronic device 100 may execute the plurality of functions based on the environment information of the electronic device 100 and the functional environment information (S640). Thereafter, the processor 120 may control the electronic device 100 to perform an operation corresponding to the determination result.

Here, the environment information of the electronic device 100 may include at least one of information on hardware included in the electronic device 100, setting information on the electronic device 100, or information on an application installed in the electronic device 100. In this case, the information on the hardware, the setting information, and the information on the applications may be applied in the same manner as described above in the functional environment information.

Specifically, the processor 120 may determine an environment of the electronic device 100 required to execute the plurality of functions based on the functional environment information. In addition, the processor 120 may determine whether or not the environment of the electronic device 100 matches the determined environment based on the environment information of the electronic device 100. To this end, a unique identifier may be assigned to the environment information of the electronic device 100 and the functional environment information to identify and match each environment.

Specifically, the processor 120 may identify an environment required for execution of the function from the functional environment information, and may identify the environment of the electronic device 100 from the environment information of the electronic device 100, thereby comparing the identified environments. That is, the processor 120 may determine whether the environment of the electronic device 100 is satisfied with the environment required to execute the plurality of functions by comparing the environments corresponding to the functional environment information and the environment information.

Here, the processor 120 may sequentially determine an environment required to execute each of the plurality of functions.

If it is determined that all the environments required to execute multiple functions are satisfied, the processor 120 may determine that the environment of the electronic device 100 matches the determined environment based on the environment information of the electronic device 100.

As an example, if the environment of the electronic device 100 matches the determined environment based on the environment information of the electronic device 100, the processor 120 may determine that the electronic device 100 may execute the plurality of functions (S640: Y).

In addition, if it is determined that the electronic device 100 may execute the plurality of functions, the processor 120 may execute a plurality of functions corresponding to the voice command (S670).

Here, the processor 120 may sequentially execute the plurality of functions corresponding to the voice command in a predetermined order.

On the other hand, as another example, if it is determined that all the environments required to execute multiple functions are not satisfied, the processor 120 may determine that the environment of the electronic device 100 does not match the determined environment based on the environment information of the electronic device 100. In this case, the processor 120 may determine that the electronic device 100 may not execute the plurality of functions (S640: N).

In addition, if it is determined that the electronic device 100 may not execute the plurality of functions, the processor 120 may determine whether or not the environment of the electronic device may be set (S650).

To this end, the processor 120 may determine an environment of the electronic device 100 that is not satisfied with the environment required to execute the plurality of functions by comparing the environments corresponding to the functional environment information and the environment information of the electronic device 100.

In this case, it is possible to determine which category the information on the environment of the electronic device 100 that is not satisfied with the environment required to execute the plurality of functions belongs to among the information on the hardware included in the electronic device 100, the setting information of the electronic device 100, and the information on the application installed in the electronic device 100.

To this end, each of the environments included in the functional environment information and the environment information of the electronic device 100 may include information indicating one of the information on the hardware included in the electronic device 100, the setting information of the electronic device 100, and the information on the application installed in the electronic device 100.

As an example, if the information on the environment of the electronic device 100 that is not satisfied with the environment required to execute the plurality of functions is information on the setting information of the electronic device 100 and the application installed in the electronic device 100, the processor 120 may determine that the environment of the electronic device 100 may be set (S650: Y).

In this case, if it is determined that the environment of the electronic device 100 may be set (S650: Y), the processor 120 may set the environment of the electronic device 100 based on the functional environment information (S660).

Here, the processor 120 may set the environment of the electronic device 100 based on the functional environment information only when a user command for setting the environment of the electronic device 100 is received (S660). To this end, the processor 120 may provide a guide related to the plurality of functions.

In addition, the processor 120 may execute a plurality of functions corresponding to the voice command based on the set environment (S670).

As an example, if the information on the environment of the electronic device 100 that is not satisfied with the environment required to execute the plurality of functions is information on the hardware provided in the electronic device 100, the processor 120 may determine that the environment of the electronic device 100 may not be set (S650: N).

In this case, if it is determined that the environment of the electronic device 100 may not be set (S650: N), the processor 120 may provide a guide related to the plurality of functions (S680).

Here, the guide may include at least one of information on an environment required to execute the plurality of functions, information on functions that may not be executed among the plurality of functions, or information on the last function executed among the plurality of functions executed sequentially when the plurality of functions are sequentially executed according to the voice command.

Figure 7:
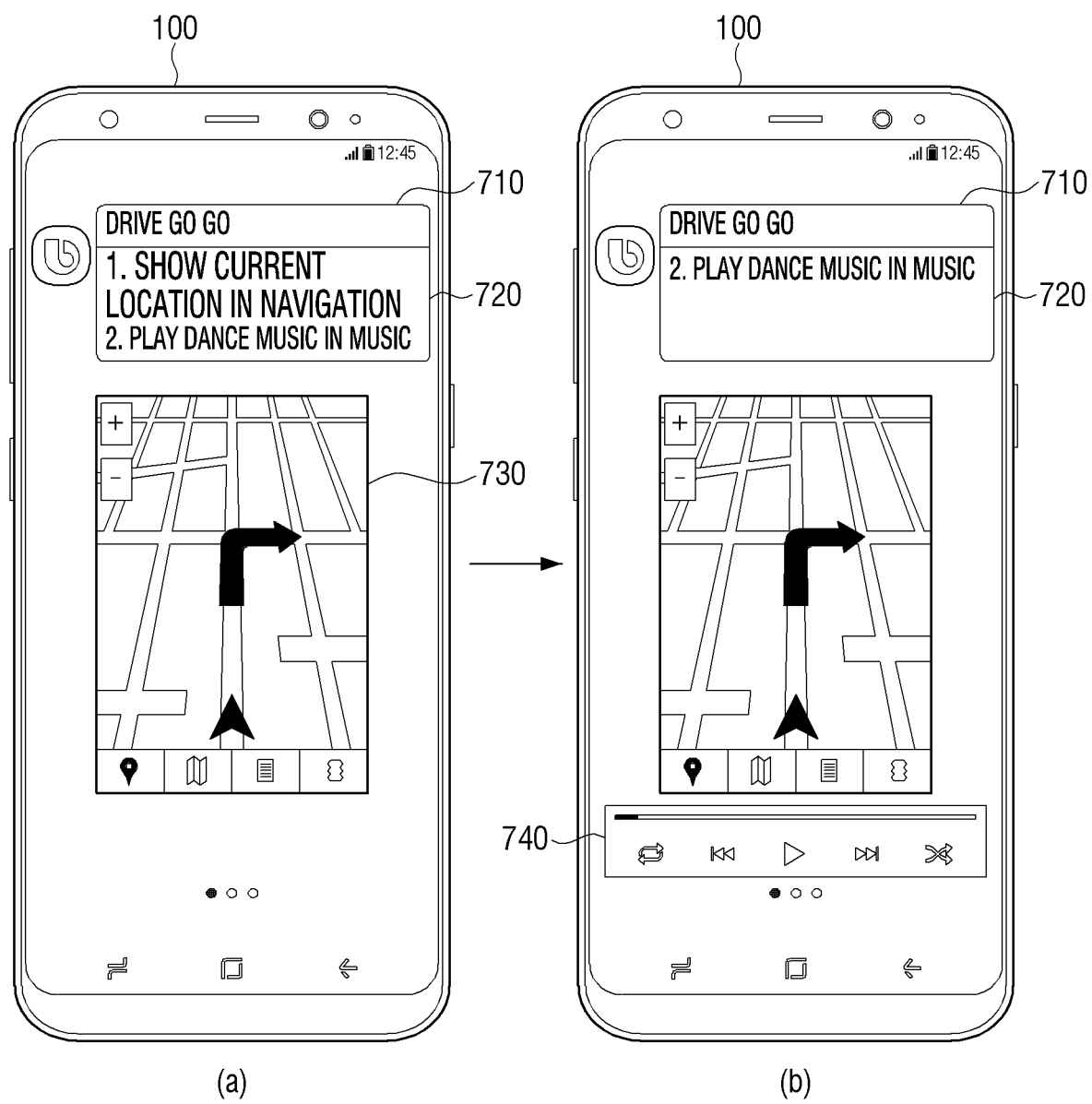
FIGS. 7 and 8 are diagrams illustrating operations performed by the electronic device according to a result of voice recognition according to an embodiment of the disclosure.
Figure 8:
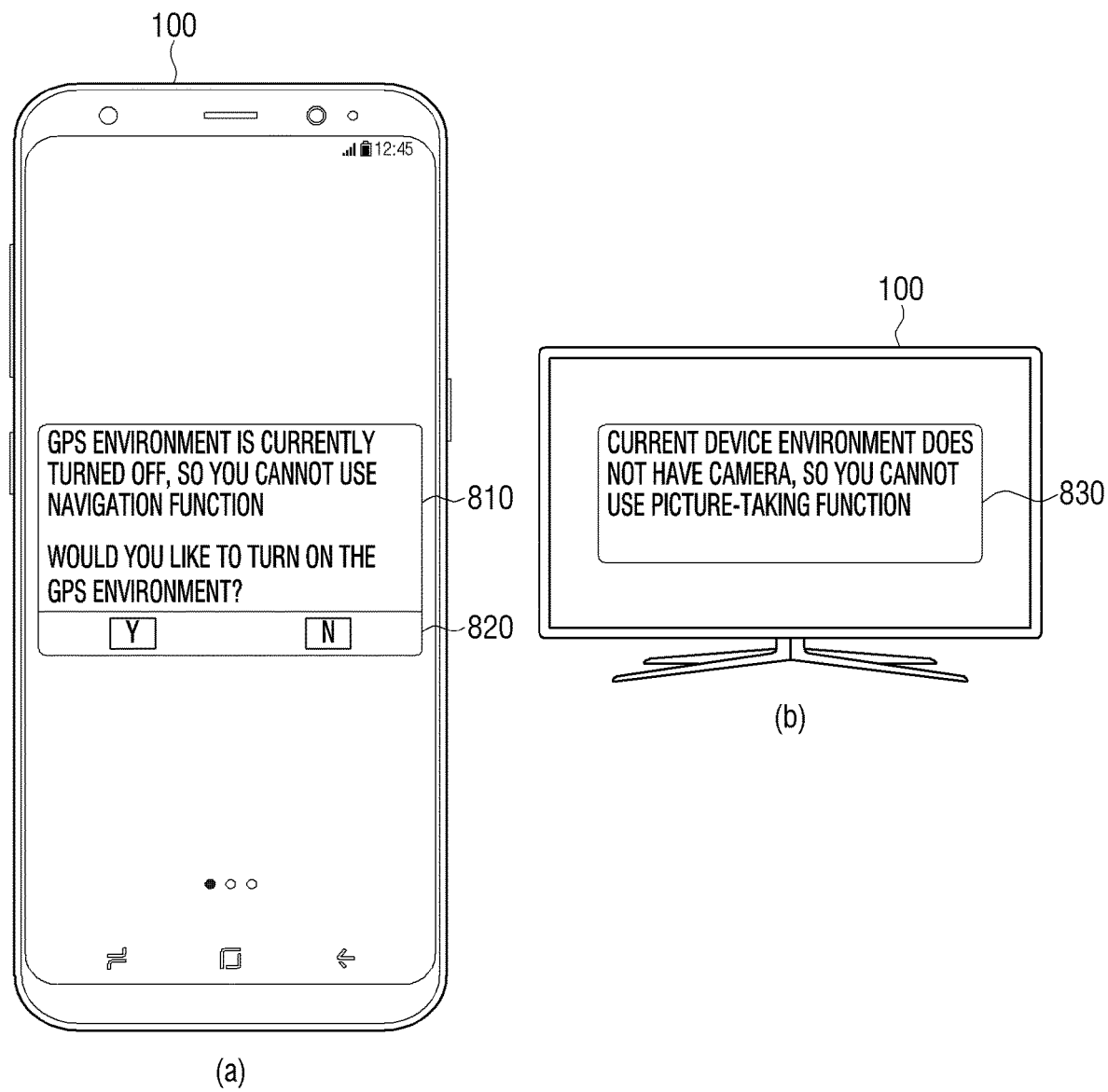

FIGS. 7 and 8 are diagrams illustrating operations performed by the electronic device according to a result of voice recognition according to an embodiment of the disclosure. Here, for convenience of description, it is assumed that the electronic device 100 includes a display (not illustrated).

Referring to FIG. 7, when it is determined that the electronic device 100 may execute the plurality of functions, an operation performed by the electronic device 100 will be described.

Here, it is assumed that the voice command is "drive go go", and the plurality of functions corresponding to the voice command is set in the order such as "show a current location in navigation" and "play a dance music in music".

For example, as illustrated in FIG. 7A, the processor 120 may provide the voice command such as "drive go go" corresponding to the uttered user's voice to a command window 710, and may provide the functions such as "show a current location in navigation" and "play a dance music in music" corresponding to the voice command to a function window 720.

In addition, the processor 120 may perform control to display a screen of a navigation app 730 by executing the function such as "show current location in navigation" according to a predetermined order.

In this case, the processor 120 may intuitively provide information on a currently executing function to the user by displaying the font, color, and size of the text corresponding to the function currently being executed through the function window 720 differently from the text corresponding to the function not currently being executed.

Thereafter, as illustrated in FIG. 7B, the processor 120 may perform control to display a control screen 740 of the music app and output music by executing the function such as "play a dance music in music" according to a predetermined order.

In this case, the processor 120 may provide information on a currently executing function to the user by deleting the text corresponding to the already executed function through the function window 720 and displaying a text corresponding to the currently executed function.

Referring to FIG. 8, when it is determined that the electronic device 100 may not execute the plurality of functions, an operation performed by the electronic device 100 will be described.

Here, it is assumed that the plurality of functions corresponding to the voice command is set such as "show a current location in navigation" and "take a picture with a camera".

In this case, the functional environment information may include information requesting that a GPS environment is turned on as the setting information of the electronic device 100 for a function such as "show a current location in navigation". In addition, the functional environment information may include information requesting that the electronic device 100 is provided with a camera module as the information on the hardware for a function such as "take a picture with a camera".

For example, as illustrated in FIG. 8A, it is assumed that the electronic device 100 is a smartphone in which the GPS environment is turned off.

In this case, the processor 120 may determine that the function such as "show a current location in navigation" may not be executed because the environment of the electronic device 100 does not match the environment requesting the GPS environment to be turned on, as the result obtained by comparing the environments corresponding to the environment information of the electronic device 100 and the functional environment information. At this time, the processor 120 may determine that the environment in which the environment of the electronic device 100 does not match belongs to a category of the setting information of the electronic device 100.

Accordingly, the processor 120 may determine that the environment of the electronic device 100 may be set, and may provide a guide 810 including information required to execute the plurality of functions and information on the functions that may not be executed among the plurality of functions, and a menu 820 that may set the environment of the electronic device 100.

Here, when a user command for selecting a "Y" menu from the menu 820 is received, the processor 120 may set the environment of the electronic device 100 as the GPS environment being turned on based on the functional environment information, and may execute the plurality of functions corresponding to the voice command. Meanwhile, as another example, the same may be applied even when a specific application is not installed.

On the other hand, when a user command for selecting an "N" menu from the menu 820 is received, the processor 120 may maintain the environment of the electronic device 100 in the same state and may remove the guide 810 and the menu 820 from the screen. In addition, in this case, the processor 120 may not execute the plurality of functions corresponding to the voice command.

Meanwhile, as another example, as illustrated in FIG. 8B, it is assumed that the electronic device 100 is a TV in which the camera module is not provided.

In this case, the processor 120 may determine that the function such as "take a picture with a camera" may not be executed because the environment of the electronic device 100 does not match the environment requesting the camera module to be provided, as the result obtained by comparing the environments corresponding to the environment information of the electronic device 100 and the functional environment information. At this time, the processor 120 may determine that the environment in which the environment of the electronic device 100 does not match belongs to a category of the information on the hardware provided in the electronic device 100. Accordingly, the processor 120 may determine that the environment of the electronic device 100 may not be set, and may provide a guide 830 including at least one of information on an environment required to execute the plurality of functions, information on functions that may not be executed among the plurality of functions, or information on the last function executed among the plurality of functions executed sequentially when the plurality of functions are sequentially executed according to the voice command.

For example, the processor 120 may perform control to display, on the display, the guide 830 for information on a function that may not be executed among the plurality of functions, such as "a current device environment does not have a camera and may not use a photo capturing function", and an environment of the electronic device 100 that does not match among the environments required for the function that may not be executed. Further, when the electronic device 100 is not provided with an environment (e.g., a camera) required to perform the plurality of functions, but is provided with an environment (e.g., a communicator, a USB module, etc.) capable of performing the plurality of functions through an external device (e.g., a smartphone), the processor 120 may perform the plurality of functions using the environment (e.g., a camera) provided in the external device. In this case, the electronic device 100 and the external device may each include a communicator and/or an input/output port.

For example, when the electronic device 100 includes the communicator, the processor 120 may search for an external device (not illustrated) connected to the same network through the communicator. In this case, the processor 120 may perform the following operation according to a predetermined state in either manual or automatic. Here, the predetermined state may be changed by the user.

In this case, when the predetermined state is manual, the processor 120 may perform control to display, on the display, a guide as to whether to perform an operation of searching for the external device connected to the same network, and to perform the operation of the external device when a user command for approving the search operation through the guide is received.

On the other hand, when the predetermined state is automatic, the processor 120 may perform control to immediately perform the operation of searching for the external device.

In addition, when the environment required to perform the plurality of functions is provided in the searched external device and the electronic device 100, the processor 120 may perform control to perform the plurality of functions using the environments of the electronic device 100 and the external device, and unlike this, when the environment required to perform the plurality of functions is not provided in the searched external device and the electronic device 100, the processor 120 may perform control to display a guide for the environment that is not provided and a function corresponding thereto.

Meanwhile, the processor 120 may display an environment required to perform the plurality of functions or the guide for the external device corresponding to the environment, and accordingly, the processor 120 may provide information on which environment is required for the user to execute the plurality of functions and/or which external device to be connected.

Meanwhile, when the electronic device 100 includes the USB module, the processor 120 may search for an external device (not illustrated) connected through the USB module, and the above description may be applied in the same manner when the electronic device 100 includes the communicator.

Meanwhile, in the example described above, it is described that the electronic device 100 receives the user's voice uttered by the user through a microphone (not illustrated) provided therein or an external microphone (not illustrated), and determines whether or not the received user command corresponds to the voice command, but it is only an example, and at least some of the functions executed in the electronic device 100 may be performed by the voice recognition server or the external device.

Referring to FIG. 9, the electronic device 100 may be implemented as an electronic device including a display (not illustrated), such as a TV. In this case, remote control devices 20 and 30 may be implemented as a remote controller 20 and a smartphone 30 capable of controlling the electronic device 100. However, the remote control devices are not limited thereto and may be variously modified and implemented.

For example, the electronic device 100 may perform voice recognition using the remote control devices 20 and 30. In this case, the electronic device 100 and the remote control devices 20 and 30 may each include a communicator (not illustrated), and may transmit and receive data through the communicator. Here, the communicator may include at least one of a Wi-Fi (Wi-Fi or Wi-Fi DIRECT) communication module, a Bluetooth module, an infrared data association (IrDA) module, a near field communication (NFC) module, or a communication module, and may be implemented by separately implementing each module or by integrating each module.

To this end, when the user voice (analog signal) uttered by the user is input to a microphone (not illustrated) or an external microphone (not illustrated) provided inside the remote control devices 20 and 30, the remote control devices 20 and 30 may receive a user voice of a digital signal by converting the analog signal into the digital signal by an analog to digital converter (ADC) (may be provided in the microphone or may be provided in the remote control devices separately from the microphone). In this case, the remote control devices 20 and 30 may transmit the received user voice of the digital signal to the electronic device 100 through the above-described communicator.

As a specific example, when the remote control device 20 is implemented as the remote controller, the remote control device 20 may include an inputter (e.g., a button, a joystick, etc.) capable of controlling the electronic device 100 such as a TV or a set-top box therein, and may control the electronic device 100 such as the TV or the set-top box through manipulation of the inputter.

To this end, when a trigger command (e.g., "Hi Bixby" and the like) is uttered by the user, or a user command for performing voice recognition is input through the inputter (e.g., a button, a joystick, a touch inputter, etc.) provided in the remote control device 20, the remote control device 20 may perform an operation of receiving the user's voice to perform the voice recognition.

As another example, when the remote control device 30 is implemented as the smartphone, the remote control device 30 may have an application capable of controlling the electronic device 100 such as a TV or a set-top box installed (or stored) therein, and may control the electronic device 100 such as the TV or the set-top box through the installed application.

To this end, when a trigger command (e.g., "Hi Bixby" and the like) is uttered by the user, or a user command for performing voice recognition is input through the inputter (e.g., a button, a joystick, a touch inputter, etc.) provided in the remote control device 30, the remote control device 30 may perform an operation of receiving the user's voice to perform the voice recognition.

Next, the electronic device 100 may transmit the received user's voice to the voice recognition server 10.

In addition, the voice recognition server 10 may convert the user's voice received from the electronic device 100 into text using an STT algorithm, and transmit information on the converted text to the electronic device 100. In this case, the voice recognition server 10 may include an automatic speech recognition (ASR) module to perform the STT function. That is, the voice recognition server 10 may be implemented as an STT server.

Meanwhile, the remote control devices 20 and 30 may directly transmit the received user's voice to the voice recognition server 10 without passing through the electronic device 100. In this case, the voice recognition server 10 may convert the received user's voice into text using the STT algorithm and transmit information on the converted text to the electronic device 100.

Next, when the information including the converted text is received from the voice recognition server 10, the electronic device 100 may determine whether or not the received user's voice corresponds to the voice command according to whether or not the texts included the received information and the information on the voice command match.

Meanwhile, in the case of the electronic device 100 specialized in a specific function (outputting image and/or audio) such as a TV, the remote control device 30 such as the smartphone may perform most operations of the electronic device 100 such as the TV.

Specifically, the remote control device 30 may receive information on the plurality of functions executed by the electronic device 100 through an application and the voice command for executing the plurality of functions, and functional environment information for executing the plurality of functions. In this case, the remote control device 30 may receive the above-described information from the electronic device 100, the external electronic device 200, or the server 300.

In addition, the remote control device 30 may determine whether or not the electronic device 100 may execute the plurality of functions based on the environment information of the electronic device 100 and the functional environment information by directly performing the voice recognition on the received user's voice, and may control the electronic device 100 to perform an operation corresponding to the determination result.

However, this is only an example, and the remote control device 30 may transmit the user's voice received by the voice recognition server 10 to perform the voice recognition to the voice recognition server 10. In addition, when the electronic device 100 receives a result of determining whether or not the electronic device 100 may execute the plurality of functions as a result of performing the voice recognition from the voice recognition server 10, the electronic device 100 may perform an operation corresponding to the received determination result.

Meanwhile, the processor 140 of the electronic device 100 may determine whether or not the electronic device 100 may execute the plurality of functions, and may control an external device (not illustrated) to output an image and/or audio corresponding to the determination result. In this case, the electronic device 100 may be implemented such as a smartphone, and the external device may be implemented such as a TV, and the electronic device 100 and the external device may transmit and receive signals for image and/or audio through an input/output port (not illustrated) or a communicator (not illustrated) provided in each of the electronic device 100 and the external device.

Meanwhile, referring to FIG. 9B, the electronic device 100 may be implemented as an electronic device that does not include a display, such as a speaker.

In this case, the electronic device 100 may be connected to an external device 40 including a display. To this end, the electronic device 100 and the external device 40 may include input/output ports such as an HDMI port, a display port, an RGB port, a digital visual interface (DVI) port, and thunderbolt, and may transmit and receive signals for image and/or audio through such input/output ports.

Here, the processor 120 of the electronic device 100 may control the electronic device 100 to perform an operation corresponding to a result of determining whether or not a function may be executed.

In this case, when the operation performed by the electronic device 100 is an operation (for example, an operation of displaying a guide on the display screen) related to the external device 40 including the display, the processor 120 may perform control to transmit an image signal for outputting the corresponding image to the external device 40 to the external device 40.

Figure 10:
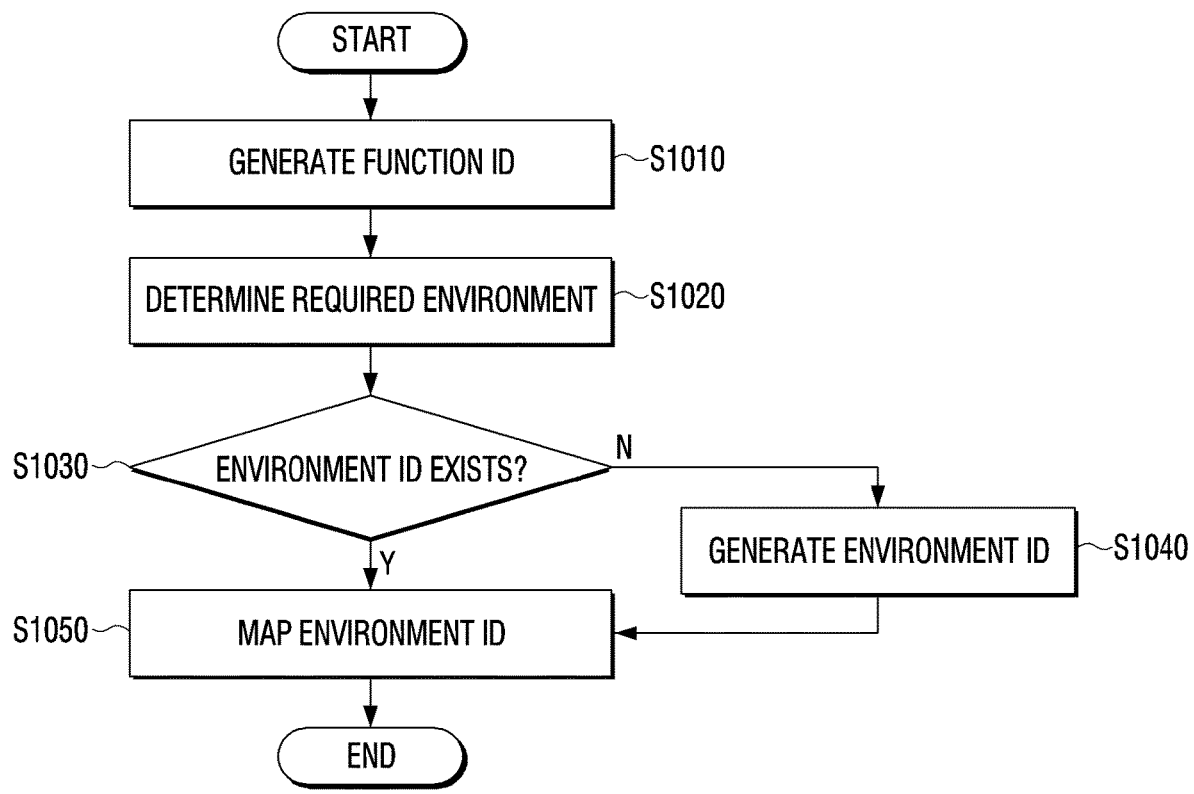
FIG. 10 is a diagram illustrating a method for managing a function according to an embodiment of the disclosure.

FIG. 10 is a diagram illustrating a method for managing a function according to an embodiment of the disclosure.

Referring to FIG. 10, when a function ID included in the received information on the plurality of functions and the voice command for executing the plurality of functions does not exist in the electronic device 100, the processor 120 may generate the function ID (S1010).

In this case, the electronic device 100 may include a function management module (not illustrated) and an environment management module (not illustrated).

To this end, the function management module may pre-store information including a function of the electronic device 100 and a function ID corresponding to the function. Here, the function ID may be an identifier assigned to identify and manage a function performed by the electronic device 100.

In addition, the processor 120 may determine an environment of the electronic device 100 required to execute a function corresponding to the function ID generated by the electronic device 100 (S1020).

To this end, the environment management module may pre-store information including the environment of the electronic device 100 and an environment ID corresponding to the environment. Here, the environment ID may be an identifier assigned to identify and manage an environment required for the electronic device 100 to perform the function.

In addition, if the environment ID corresponding to the environment required for the generated function ID does not exist in the electronic device 100, the processor 120 may generate a new environment ID (S1040). In this case, the processor 120 may store the generated environment ID in the environment management module.

In addition, the processor 120 may map the environment ID corresponding to the environment required for the function ID to the function ID (S1050), and may store the function ID and the environment ID mapped to the function ID in the function management module.

Figure 11:
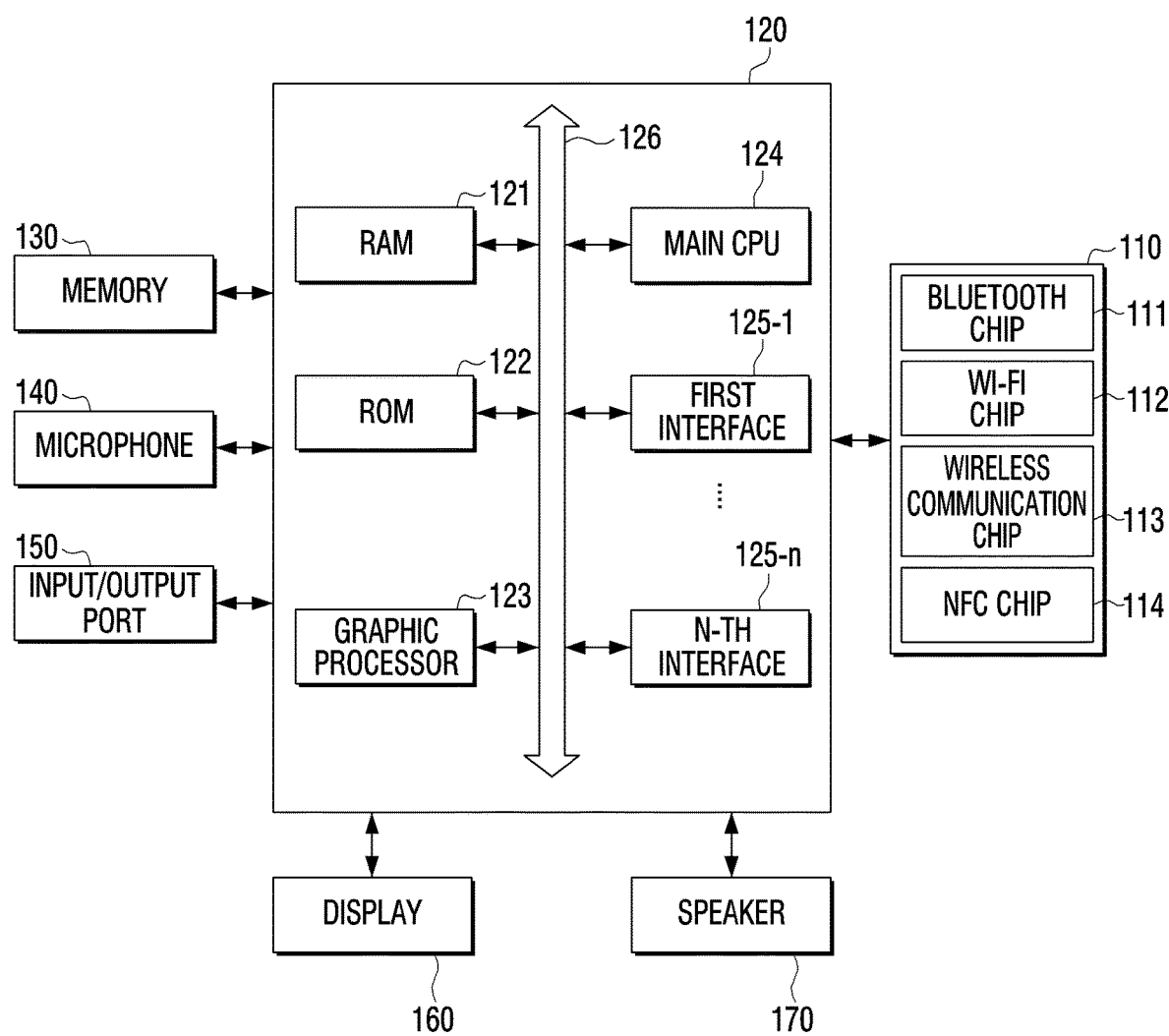
FIG. 11 is a block diagram illustrating a detailed configuration of an electronic device according to an embodiment of the disclosure.

FIG. 11 is a block diagram illustrating a detailed configuration of an electronic device according to an embodiment of the disclosure.

Referring to FIG. 11, the electronic device 100 may include one of a memory 130, a microphone 140, an input/output port 150, a display 160, and a speaker 170, in addition to the communicator 110 and the processor 120.

The communicator 110 may transmit and receive various types of data by performing communication with various types of external devices according to various types of communication methods. The communicator 110 may include at least one of a Bluetooth chip 111, a Wi-Fi chip 112, a wireless communication chip 113, and a near field communication (NFC) chip 114 for performing wireless communication, and an Ethernet module (not illustrated) and a USB module (not illustrated) for performing wired communication. In this case, the Ethernet module (not illustrated) and the USB module (not illustrated) for performing wired communication may communicate with the external devices through the input/output port 150.

The processor 120 includes a random access memory (RAM) 121, a read only memory (ROM) 122, a graphics processing unit 123, a main central processing unit (CPU) 124, first to n-th interfaces 125-1 to 125-n, and a bus 126. At this time, the RAM 121, the ROM 122, the graphics processing unit 123, the main CPU 124, the first to n-th interfaces 125-1 to 125-n, and the like, may be connected to each other through the bus 126.

The memory 130 may store various programs and data required for an operation of the electronic device 100.

The memory 130 may be implemented as a non-volatile memory, a volatile memory, a flash-memory, a hard disc drive (HDD), a solid state drive (SSD), or the like. The memory 130 is accessed by the processor 120, and data read/write/edit/delete/update by the processor 120 may be performed. In the disclosure, a term 'memory' includes the memory 130, a read only memory (ROM) 121 in the processor 120, a random access memory (RAM) 122, or a memory card (not illustrated) (for example, a micro secure digital (SD) card or a memory stick) mounted in the electronic device 100.

The microphone 140, which is built in the electronic device 100, may directly receive a user's voice, and may acquire an audio signal by converting the user's voice, which is an analog signal, into a digital by a digital converter (not illustrated).

The input/output port 150 is a component that connects the electronic device 100 and an external device (not illustrated) by a wired manner so that the electronic device 100 may transmit and/or receive signals for images and/or audio with the external device (not illustrated).

To this end, the input/output port 150 may be implemented as a wired port such as an HDMI port, a display port, an RGB port, a digital visual interface (DVI) port, a thunderbolt, a component port, or the like.

As an example, the electronic device 100 may receive the signals for images and/or audio through the input/output port 150 so that the electronic device 100 may output the images and/or audio. As another example, the electronic device 100 may transmit the signals for specific images and/or audio to the external device through the input/output port 150 so that the external device (not illustrated) may output the images and/or audio.

As such, the signals for images and/or audio may be transmitted in one direction through the input/output port 150. However, this is only an example, and the signals for images and/or audio may be transmitted in both directions through the input/output port 150.

The display 160 may display, a display region, image data processed by an image processor (not illustrated). The display region may mean at least a portion of the display 160 exposed on one surface of a housing of the electronic device 100. At least a portion of the display 110 may also be coupled to at least one of a front region, a side region, and a rear region of the electronic device 160 in the form of a flexible display. The flexible display may be bent, curved, or rolled without being damaged through a thin and flexible substrate like paper.

The speaker 170, which is built in the electronic device 100, may directly output various alarms or audio messages as well as various audio data on which various processing operations such as decoding, amplification, noise filtering, and the like, are performed by an audio processor (not illustrated) as sound.

The inputter (not illustrated) may receive various user inputs and transmit the received user inputs to the processor 120. The inputter (not illustrated) may include, for example, a touch sensor, a (digital) pen sensor, and a key. The touch panel may use at least one of, for example, a capacitive manner, a resistive manner, an infrared manner, or an ultrasonic manner. In addition, the touch panel may further include a control circuit. The touch panel may further include a tactile layer to provide a tactile reaction to the user. The (digital) pen sensor may be, for example, a portion of the touch panel or may include a separate sheet for recognition. The key may include, for example, a physical button, an optical key, or a keypad. Alternatively, the inputter (not illustrated) may be connected by a wired or wireless manner from an external device (not illustrated) such as a keyboard or a mouse to receive a user input.

Figure 12:
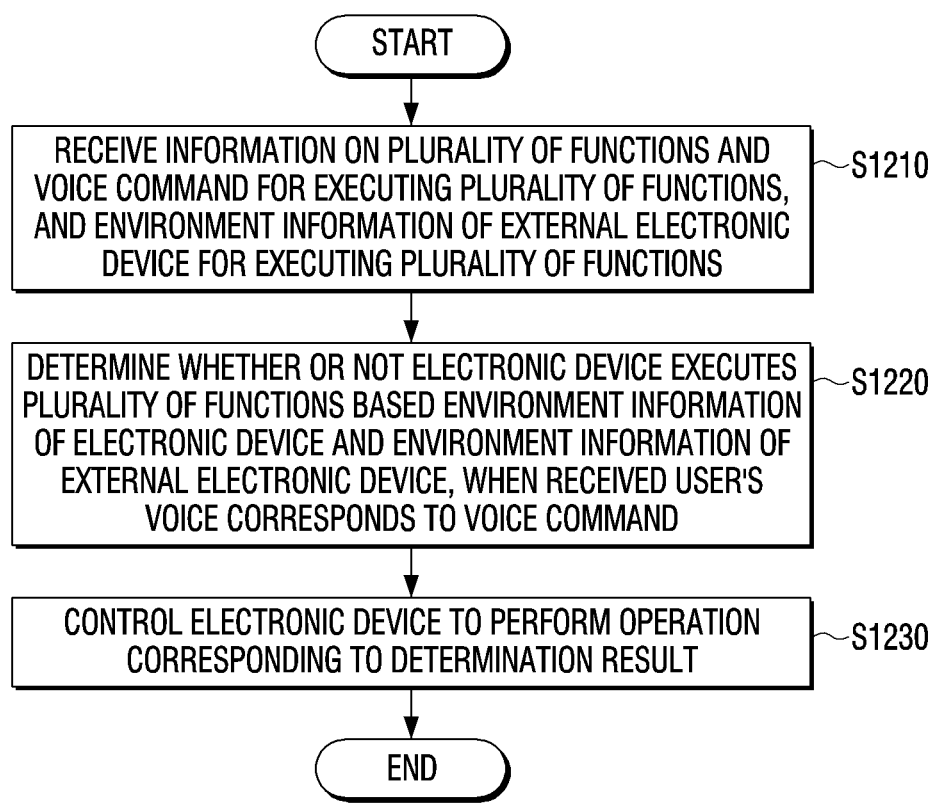
FIG. 12 is a flowchart illustrating a method for controlling an electronic device according to an embodiment of the disclosure.

FIG. 12 is a flowchart illustrating a method for controlling an electronic device according to an embodiment of the disclosure.

Referring to FIG. 12, first, information on a plurality of functions and a voice command for executing the plurality of functions and functional environment information for executing the plurality of functions may be received (S1210).

Here, in the receiving of the information on a plurality of functions and a voice command for executing the plurality of functions and functional environment information for executing the plurality of functions, the information on a plurality of functions and a voice command for executing the plurality of functions and functional environment information for executing the plurality of functions may be received from a server.

Next, if the received user's voice corresponds to the voice command, it may be determined whether or not the plurality of functions may be executed in the electronic device based on the environmental information of the electronic device and the functional environment information (S1220), and the electronic device may be controlled to perform an operation corresponding to the determination result (S1230). In this case, the user's voice may be received through a microphone provided in the electronic device or may be received from an external electronic device.

Here, the environment information of the electronic device and the functional environment information may include at least one of information on hardware included in the electronic device, setting information on the electronic device, or information on an application installed in the electronic device.

In the determining of whether or not the plurality of functions may be executed, an environment of the electronic device required to execute the plurality of functions may be determined based on the functional environment information.

In addition, if the environment of the electronic device matches the determined environment based on the environment information of the electronic device, it may be determined that the electronic device may execute the plurality of functions.

The determining of whether or not the plurality of functions may be executed may executing the plurality of functions corresponding to the voice command, when it is determined that the electronic device may execute the plurality of functions.

Meanwhile, if the environment of the electronic device does not match the determined environment based on the environment information of the electronic device, it may be determined that the electronic device may not execute the plurality of functions.

Here, in the determining of whether or not the plurality of functions may be executed, if it is determined that the electronic device may not execute the plurality of functions, the environment of the electronic device may be set based on the functional environment information, and the plurality of functions corresponding to the voice command may be executed based on the set environment.

Meanwhile, the determining of whether or not the plurality of functions may be executed may providing a guide related to the plurality of functions, when it is determined that the electronic device may not execute the plurality of functions.

Here, the guide may include at least one of information on an environment required to execute the plurality of functions, information on functions that may not be executed among the plurality of functions, or information on the last function executed among the plurality of functions executed sequentially when the plurality of functions are sequentially executed according to the voice command.

The diverse embodiments of the disclosure may be implemented by software including instructions that are stored in machine (e.g., a computer)-readable storage media. The machine is a device that invokes the stored instructions from the storage medium and is operable according to the called instruction, and may include the electronic device (e.g., the electronic device 100) according to the disclosed embodiments. When the instructions are executed by the processor, the processor may perform functions corresponding to the instructions, either directly or using other components under the control of the processor. The commands may include codes generated or executed by a compiler or an interpreter. The machine-readable storage media may be provided in the form of non-transitory storage media. Here, the term 'non-transitory' means that the storage medium does not include a signal and is tangible, but does not distinguish whether data is stored semi-permanently or temporarily in the storage medium.

The method according to diverse embodiments may be provided as being included in a computer program product.

The computer program product may be traded as a product between a seller and a purchaser. The computer program product may be distributed in the form of a machine-readable storage medium (e.g., a compact disc read only memory (CD-ROM)), or online through an application store (e.g., PlayStore™). In the case of the online distribution, at least a portion of the computer program product may be at least temporarily stored in a storage medium such as a memory of a server of a manufacturer, a server of an application store, or a relay server, or be temporarily generated.

Each of the components (e.g., modules or programs) according to the diverse embodiments may include a single entity or a plurality of entities, and some sub-components of the sub-components described above may be omitted, or other sub-components may be further included in the diverse embodiments. Alternatively or additionally, some components (e.g., modules or programs) may be integrated into one entity to perform the same or similar functions performed by the respective components prior to the integration. The operations performed by the module, the program, or other component, in accordance with the diverse embodiments may be executed in a sequential, parallel, iterative, or heuristic manner, or at least some operations may be executed in a different order or omitted, or other operations may be added.

The invention claimed is:

1. An electronic device comprising:
a communicator; and
a processor configured to:
obtain information on a plurality of functions and a voice command for executing the plurality of functions, and functional environment information for executing the plurality of functions, through the communicator,
determine an environment of the electronic device required to execute the plurality of functions based on the functional environment information when a received user's voice corresponds to the voice command,
determine that the electronic device executes the plurality of functions when the environment of the electronic device matches the determined environment based on the environment information of the electronic device and execute the plurality of functions corresponding to the voice command, and
determine that the electronic device does not execute the plurality of functions when the environment of the electronic device does not match the determined environment based on the environment information of the electronic device, and set an environment of the electronic device based on the functional environment information and execute the plurality of functions corresponding to the voice command based on the set environment, or provide a guide related to the plurality of functions,
wherein the environment information of the electronic device and the functional environment information include at least one of information on hardware included in the electronic device, setting information of the electronic device, or information on an application installed in the electronic device.

2. The electronic device as claimed in claim 1, wherein the guide includes at least one of information on an environment required to execute the plurality of functions, information on functions that are not executed among the plurality of functions, or information on a last function executed among the plurality of functions executed sequentially when the plurality of functions are sequentially executed according to the voice command.

3. The electronic device as claimed in claim 1, wherein the processor is configured to receive the information on the plurality of functions and the voice command for executing the plurality of functions, and
the functional environment information for executing the plurality of functions from a server.

4. The electronic device as claimed in claim 3, wherein the electronic device and an external electronic device is synchronized in real time through the server, and
wherein the processor is configured to:
receive, from the server, the information on the plurality of functions and the voice command, and the functional environment information which is transmitted from the external electronic device to the server.

5. The electronic device as claimed in claim 3, wherein the processor is configured to:
receive, from the server, the information on the plurality of functions and the voice command, and the functional environment information after transmitting authentication information by performing an authentication process to the server.

6. The electronic device as claimed in claim 1, wherein the processor is configured to receive the user's voice through a microphone included in the electronic device, or receive the user's voice from an external electronic device through the communicator.

7. A method for controlling an electronic device, the method comprising:
obtaining information on a plurality of functions and a voice command for executing the plurality of functions, and functional environment information for executing the plurality of functions;
determining an environment of the electronic device required to execute the plurality of functions based on the functional environment information when a received user's voice corresponds to the voice command; and
determining that the electronic device executes the plurality of functions when the environment of the electronic device matches the determined environment based on the environment information of the electronic device, and execute the plurality of functions corresponding to the voice command, and
determining that the electronic device does not execute the plurality of functions when the environment of the electronic device does not match the determined environment based on the environment information of the electronic device, and setting an environment of the electronic device based on the functional environment information and executing the plurality of functions corresponding to the voice command based on the set environment, or providing a guide related to the plurality of functions,
wherein the environment information of the electronic device and the functional environment information include at least one of information on hardware included in the electronic device, setting information of the electronic device, or information on an application installed in the electronic device.

8. The method as claimed in claim 7, wherein the guide includes at least one of information on an environment required to execute the plurality of functions, information on functions that are not executed among the plurality of functions, or information on a last function executed among the plurality of functions executed sequentially when the plurality of functions are sequentially executed according to the voice command.

* * * * *